US012659100B2

(12) United States Patent
Koskela et al.

(10) Patent No.: US 12,659,100 B2
(45) Date of Patent: Jun. 16, 2026

(54) METHOD AND APPARATUS FOR SOUNDING REFERENCE SIGNAL TRANSMISSION

(71) Applicant: Nokia Technologies Oy, Espoo (FI)

(72) Inventors: Timo Koskela, Oulu (FI); Sami-Jukka Hakola, Oulu (FI); Juha Pekka Karjalainen, Oulu (FI); Keeth Saliya Jayasinghe Laddu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 276 days.

(21) Appl. No.: 18/463,891

(22) Filed: Sep. 8, 2023

(65) Prior Publication Data

US 2024/0113825 A1 Apr. 4, 2024

(30) Foreign Application Priority Data

Sep. 30, 2022 (FI) ..................................... 20225876

(51) Int. Cl.
*H04L 5/00* (2006.01)
(52) U.S. Cl.
CPC .......... *H04L 5/0048* (2013.01); *H04L 5/0046* (2013.01); *H04L 5/0094* (2013.01)
(58) Field of Classification Search
CPC ..... H04L 5/003; H04L 5/0044; H04L 5/0046; H04L 5/0048; H04L 5/0094; H04L 25/0224
See application file for complete search history.

(56) References Cited

U.S. PATENT DOCUMENTS

| | | | |
|---|---|---|---|
| 12,309,715 B2 * | 5/2025 | Khoshnevisan ...... | H04W 52/06 |
| 2019/0058517 A1 | 2/2019 | Kang et al. | |
| 2021/0105805 A1 | 4/2021 | Venugopal et al. | |

(Continued)

FOREIGN PATENT DOCUMENTS

| | | |
|---|---|---|
| WO | 2021/070374 A1 | 4/2021 |
| WO | 2021/095104 A1 | 5/2021 |

(Continued)

OTHER PUBLICATIONS

Extended European Search Report received for corresponding European Patent Application No. 23201134.6, dated Mar. 1, 2024, 11 pages.

(Continued)

*Primary Examiner* — Jeong S Park
(74) *Attorney, Agent, or Firm* — Barta Jones, PLLC

(57) ABSTRACT

Embodiments of the present disclosure relate to methods and apparatuses for sounding reference signal transmission. According to some embodiments, an apparatus is caused at least to: receive, from a network device sounding reference signal (SRS) configuration comprising one or more SRS resource sets; receive, from the network device, a message comprising an indication of which one of the one or more SRS resource sets is configured or enabled to follow or not follow corresponding one or more indicated transmission configuration indication (TCI) states from an activated TCI list for the apparatus; and transmit, to the network device, an SRS based on the indication. In this way, SRS resource sets may be dynamically detached to not follow specific TCI state and used for sounding the uplink channel in an efficient manner.

5 Claims, 9 Drawing Sheets

(56)                    References Cited

U.S. PATENT DOCUMENTS

| | | | |
|---|---|---|---|
| 2022/0239440 A1 | 7/2022 | Go et al. | |
| 2022/0264475 A1 | 8/2022 | Yi et al. | |
| 2022/0330167 A1* | 10/2022 | Chen | H04W 52/54 |
| 2023/0033910 A1* | 2/2023 | Khoshnevisan | H04L 5/0048 |
| 2023/0164606 A1* | 5/2023 | Zhou | H04L 5/0073 |
| | | | 370/329 |
| 2023/0345382 A1* | 10/2023 | Khoshnevisan | H04W 52/367 |
| 2023/0396375 A1* | 12/2023 | Muruganathan | H04L 5/0091 |
| 2024/0187176 A1* | 6/2024 | Wang | H04W 72/23 |
| 2024/0224236 A1* | 7/2024 | Yuan | H04L 5/0051 |
| 2024/0276554 A1* | 8/2024 | Yuan | H04B 7/0626 |
| 2024/0324047 A1* | 9/2024 | Wang | H04W 24/08 |
| 2025/0106869 A1* | 3/2025 | Yuan | H04W 72/232 |

FOREIGN PATENT DOCUMENTS

| | | |
|---|---|---|
| WO | 2022/084215 A1 | 4/2022 |
| WO | 2022/244951 A1 | 11/2022 |

OTHER PUBLICATIONS

"Discussion on unified TCI framework extension for multi-TRP", 3GPP TSG RAN WG1 #110, R1-2206463, Agenda item: 9.1.1.1, NEC, Aug. 22-26, 2022, pp. 1-5.

"Enhancements on unified TCI framework extension for multi-TRP", 3GPP TSG RAN WG1 Meeting #110, R1-2205918, Agenda Item: 9.1.1.1, ZTE, Aug. 22-26, 2022, 11 pages.

"New WID: MIMO Evolution for Downlink and Uplink", 3GPP TSG RAN Meeting #94e, RP-213598, Agenda: 8A.1, Samsung, Dec. 6-17, 2021, 6 pages.

"3rd Generation Partnership Project; Technical Specification Group Radio Access Network; NR; Medium Access Control (MAC) protocol specification (Release 17)", 3GPP TS 38.321, V17.1.0, Jun. 2022, pp. 1-241.

"3rd Generation Partnership Project; Technical Specification Group Radio Access Network; NR; Multiplexing and channel coding (Release 17)", 3GPP TS 38.212, V17.3.0, Sep. 2022, pp. 1-201.

"IEEE 802.11", Wikipedia, Retrieved on Oct. 3, 2023, Webpage available at : https://en.wikipedia.org/wiki/IEEE_802.11.

Office action received for corresponding Finnish Patent Application No. 20225876, dated Feb. 15, 2023, 10 pages.

"Enhancement on multi-beam operation", 3GPP TSG RAN WG1 Meeting #105-e, R1-2104205, Agenda: 8.1.1, Futurewei, May 19-27, 2021, 11 pages.

"Enhancements on multi-beam operation", 3GPP TSG RAN WG1 Meeting #105-e, R1-2104266, Agenda: 8.1.1, Huawei, May 10-27, 2021, 13 pages.

Office action received for corresponding Finnish Patent Application No. 20225876, dated Jun. 7, 2023, 11 pages.

* cited by examiner

Activated TCI list 1

TCI state #0

å

TCI state #n

DCI

1st Indicated
TCI State

2nd Indicated
TCI State

120

130

110

(activated) TCI States List

--- DCI codepoint #1 ---
0 TCI State #0 Joint DL/UL
1 TCI State #1 Joint DL/UL

--- DCI codepoint #2 ---
0 TCI State #2 Joint DL/UL
1 TCI State #3 Joint DL/UL

--- DCI codepoint #3 ---
0 TCI State #4 Joint DL/UL
1 Null
--- DCI codepoint #3 ---

...
--- DCI codepoint #n ---
X TCI State #n joint/DL orUL.

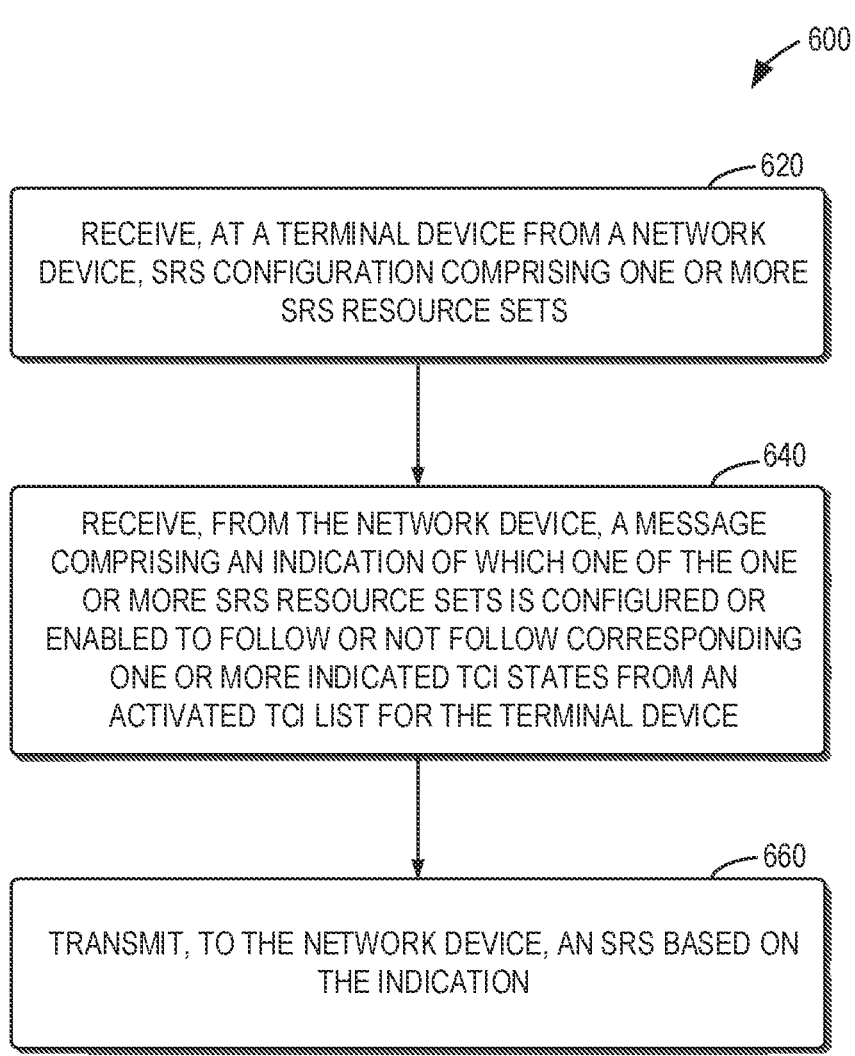

600

620

RECEIVE, AT A TERMINAL DEVICE FROM A NETWORK DEVICE, SRS CONFIGURATION COMPRISING ONE OR MORE SRS RESOURCE SETS

640

RECEIVE, FROM THE NETWORK DEVICE, A MESSAGE COMPRISING AN INDICATION OF WHICH ONE OF THE ONE OR MORE SRS RESOURCE SETS IS CONFIGURED OR ENABLED TO FOLLOW OR NOT FOLLOW CORRESPONDING ONE OR MORE INDICATED TCI STATES FROM AN ACTIVATED TCI LIST FOR THE TERMINAL DEVICE

660

TRANSMIT, TO THE NETWORK DEVICE, AN SRS BASED ON THE INDICATION

METHOD AND APPARATUS FOR SOUNDING REFERENCE SIGNAL TRANSMISSION

CROSS REFERENCE TO RELATED APPLICATION

This application claims the benefit of Finnish application No. 20225876 filed on 30 Sep. 2022, which is incorporated herein by reference in its entirety.

FIELD

Various example embodiments relate to the field of telecommunication and in particular, to a method, device, apparatus and computer readable storage medium for sounding reference signal (SRS) transmission.

BACKGROUND

In a communication network, user equipment (UE) may have one or more transmit and receive antenna panels and operate using respective beams for reception and transmission. Unified transmission configuration indication (TCI) state framework is proposed in Rel-17. Enhancements on SRS transmission for single panel UEs and/or multi-panel UEs (MP-UEs) in unified TCI state framework are still needed.

SUMMARY

In general, example embodiments of the present disclosure provide a solution for SRS transmission in unified TCI state framework.

In a first aspect, there is provided an apparatus. The apparatus comprises at least one processor and at least one memory comprising computer program code. The at least one memory and computer program code are configured, with the at least one processor, to cause the apparatus at least to: receive, from a network device sounding reference signal, SRS, configuration comprising one or more SRS resource sets; receive, from the network device, a message comprising an indication of which one of the one or more SRS resource sets is configured or enabled to follow or not follow corresponding one or more indicated Transmission Configuration Indication, TCI, states from an activated TCI list for the apparatus; and transmit, to the network device, an SRS based on the indication.

In a second aspect, there is provided an apparatus. The apparatus comprises at least one processor and at least one memory comprising computer program code. The at least one memory and computer program code are configured, with the at least one processor, to cause the apparatus at least to: transmit, to a terminal device, sounding reference signal, SRS, configuration comprising one or more SRS resource sets; transmit, to the terminal device, a message comprising an indication of which one of the one or more SRS resource sets is configured or enabled to follow or not follow corresponding one or more indicated Transmission Configuration Indication, TCI, states from an activated TCI list for the terminal device; and receive, from the terminal device, an SRS based on the indication.

In a third aspect, there is provided a method. The method comprises receiving, at a terminal device from a network device, sounding reference signal, SRS, configuration comprising one or more SRS resource sets; receiving, from the network device, a message comprising an indication of which one of the one or more SRS resource sets is configured or enabled to follow or not follow corresponding one or more indicated Transmission Configuration Indication, TCI, states from an activated TCI list for the terminal device; and transmitting, to the network device, an SRS based on the indication.

In a fourth aspect, there is provided a method. The method comprises transmitting, from a network device to a terminal device, sounding reference signal, SRS, configuration comprising one or more SRS resource sets; transmitting, to the terminal device, a message comprising an indication of which one of the one or more SRS resource sets is configured or enabled to follow or not follow corresponding one or more indicated Transmission Configuration Indication, TCI, states from an activated TCI list for the terminal device; and receiving, from the terminal device, an SRS based on the indication.

In a fifth aspect, there is provided an apparatus. The apparatus comprises means for receiving, at a terminal device from a network device, sounding reference signal, SRS, configuration comprising one or more SRS resource sets; means for receiving, from the network device, a message comprising an indication of which one of the one or more SRS resource sets is configured or enabled to follow or not follow corresponding one or more indicated Transmission Configuration Indication, TCI, states from an activated TCI list for the terminal device; and means for transmitting, to the network device, an SRS based on the indication.

In a sixth aspect, there is provided an apparatus. The apparatus comprises means for transmitting, from a network device to a terminal device, sounding reference signal, SRS, configuration comprising one or more SRS resource sets; means for transmitting, to the terminal device, a message comprising an indication of which one of the one or more SRS resource sets is configured or enabled to follow or not follow corresponding one or more indicated Transmission Configuration Indication, TCI, states from an activated TCI list for the terminal device; and means for receiving, from the terminal device, an SRS based on the indication.

In a seventh aspect, there is provided a computer readable medium. The computer readable medium comprises program instructions that, when executed by an apparatus, cause the apparatus to perform at least the method according to any one of the above third or fourth aspect.

In an eighth aspect, there is provided a computer program. The computer program comprises instructions. When executed by an apparatus, the instructions cause the apparatus at least to receive, from a network device SRS configuration comprising one or more SRS resource sets; receive, from the network device, a message comprising an indication of which one of the one or more SRS resource sets is configured or enabled to follow or not follow corresponding one or more indicated TCI states from an activated TCI list for the apparatus; and transmit, to the network device, an SRS based on the indication.

In a ninth aspect, there is provided a computer program. The computer program comprises instructions. When executed by an apparatus, the instructions cause the apparatus at least to transmit, to a terminal device, sounding reference signal, SRS, configuration comprising one or more SRS resource sets; transmit, to the terminal device, a message comprising an indication of which one of the one or more SRS resource sets is configured or enabled to follow or not follow corresponding one or more indicated Transmission Configuration Indication, TCI, states from an activated TCI list for the terminal device; and receive, from the terminal device, an SRS based on the indication.

In a tenth aspect, there is provided a terminal device. The terminal device comprises receiving circuitry configured to receive, from a network device SRS configuration comprising one or more SRS resource sets; receiving circuitry configured to receive, from the network device, a message comprising an indication of which one of the one or more SRS resource sets is configured or enabled to follow or not follow corresponding one or more indicated TCI states from an activated TCI list for the terminal device; and transmitting circuitry configured to transmit, to the network device, an SRS based on the indication.

In an eleventh aspect, there is provided a network device. The network device comprises configuration transmitting circuitry configured to transmit, to a terminal device, sounding reference signal, SRS, configuration comprising one or more SRS resource sets; transmitting circuitry configured to transmit, to the terminal device, a message comprising an indication of which one of the one or more SRS resource sets is configured or enabled to follow or not follow corresponding one or more indicated Transmission Configuration Indication, TCI, states from an activated TCI list for the terminal device; and receiving circuitry configured to receive, from the terminal device, an SRS based on the indication.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where:

FIG. 6 illustrates a flowchart of a method implemented at a terminal device according to some embodiments of the present disclosure;

Throughout the drawings, the same or similar reference numerals represent the same or similar element.

DETAILED DESCRIPTION

Figures 1A, 1B:
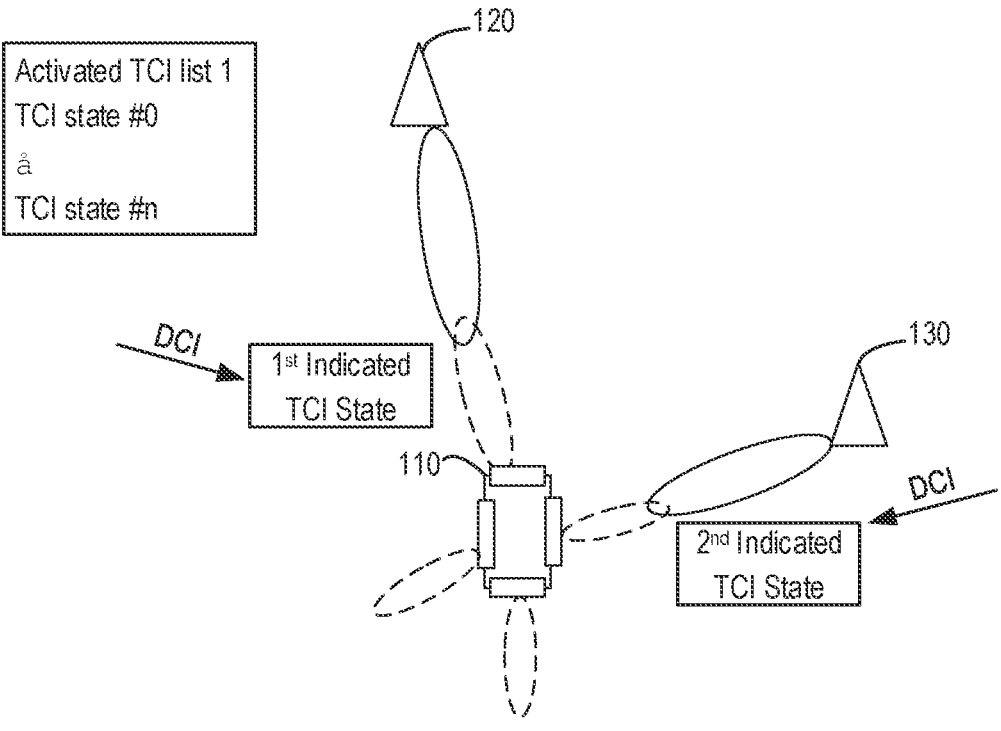
FIGS. 1A-1C illustrate example diagrams for indication of TCI states in related art.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As used herein, the term "TRP" refers to a transmission reception point having an antenna array (with one or more antenna elements) at the network side located at a specific geographical location, which may be used for transmitting and receiving signals to/from the terminal device. In embodiment of the present disclosure, a TRP may refer to Macro Cell, micro cell, an RRH, a relay, a femto node, a pico node, etc. Although some embodiments of the present disclosure are described with reference to two TRPs for example, these embodiments are only for the purpose of illustration and help those skilled in the art to understand and implement the present disclosure, without suggesting any limitations as to the scope of the present disclosure. It is to be understood that the present disclosure described herein can be implemented in various manners other than the ones described below.

Some embodiments described herein may relate to $3^{rd}$ generation partnership project (3GPP) NR physical layer design for multiple input multiple output (MIMO) enhancements in Rel-18 and beyond. More specifically, some embodiments provide enhanced procedures for multi-panel uplink (UL) operation in unified TCI framework.

It has been agreed in 3GPP that a solution for facilitating simultaneous multi-panel UL transmission for higher UL throughput/reliability, focusing on FR2 and multi-TRP with an assumption of up to 2 TRPs and up to 2 panels needs to be studied, and if needed, specified. The study may be developed in terms of UL precoding indication for PUSCH and UL beam indication for PUCCH/PUSCH. Such techniques may be targeted at Customer Premise Equipment/fixed wireless access/vehicle/industrial devices (if applicable).

Rel-17 introduced multi-TRP Time-Division Multiplexing (TDM) PUSCH repetition operation. In Rel-17, two SRS resource sets may be configured to have the same number of SRS resources in each set. For codebook-based mode, there are two SRS resource indicator (SRI) fields and two 'precoding information and number of layers' fields, where the second field doesn't indicate number of layers. For non-codebook based mode, there are two SRI fields where the second field doesn't indicate number of layers. The same number of layers per TRP is assumed, i.e., the same number of layers for all the PUSCH repetitions is assumed. For mapping two SRIs to PUSCH repetitions, either cyclical or sequential mapping can be configured via a radio resource control (RRC). Nominal PUSCH repetitions are used for the mapping for PUSCH repetition Type B. As shown in Table 1, a new 2-bit DCI field, i.e., SRS resource set indicator field, is introduced allowing dynamic switching between single-TRP and multi-TRP PUSCH operations, and dynamic change of TRP order.

TABLE 1

| Code-point | SRS resource set(s) | SRI/TPMI field(s) |
|---|---|---|
| 00 | S-TRP mode with $1^{st}$ SRS resource set (TRP1) | $1^{st}$ SRI/TPMI field ($2^{nd}$ field is unused) |
| 01 | S-TRP mode with $2^{nd}$ SRS resource set (TRP2) | $1^{st}$ SRI/TPMI field ($2^{nd}$ field is unused) |
| 10 | M-TRP mode with (TRP1, TRP2 order): $1^{st}$ SRI/TPMI field: $1^{st}$ SRS resource set $2^{nd}$ SRI/TPMI field: $2^{nd}$ SRS resource set | Both $1^{st}$ and $2^{nd}$ SRI/TPMI fields |
| 11 | M-TRP mode with (TRP2, TRP1 order): | Both $1^{st}$ and $2^{nd}$ |

7

TABLE 1-continued

| Code-point | SRS resource set(s) | SRI/TPMI field(s) |
|---|---|---|
| | 1ˢᵗ SRI/TPMI field: 1ˢᵗ SRS resource set 2ⁿᵈ SRI/TPMI field: 2ⁿᵈ SRS resource set | SRI/TPMI fields |

Figure 1C:
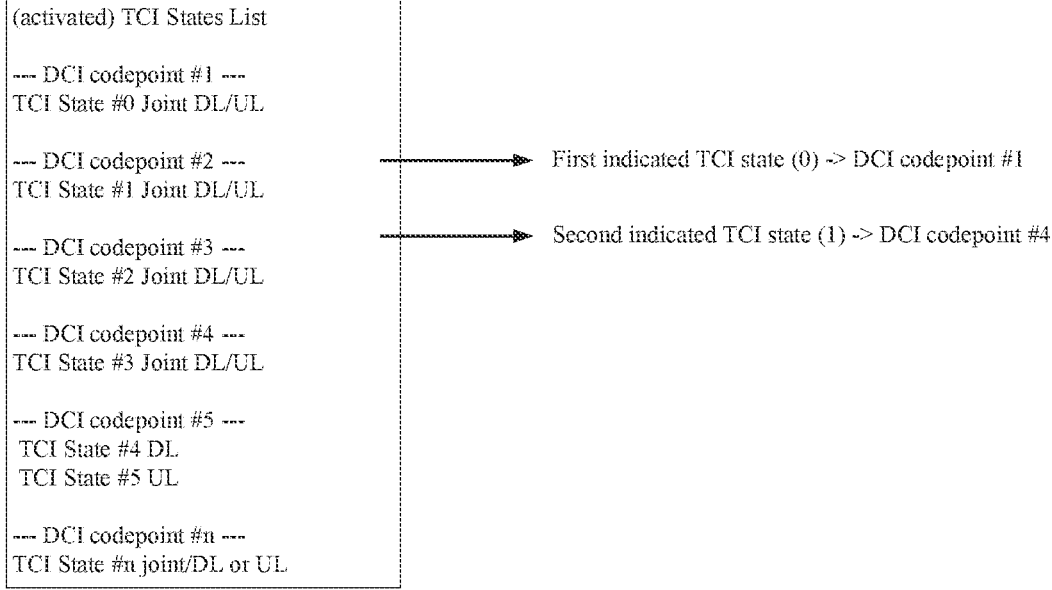

Based on Rel-17, a terminal device may be configured with up to two SRS resource sets, each set comprising one or more SRS resources. A set can be considered to be associated to a UE panel, i.e. up to two UE panels can be supported based on the configuration. The methods described herein are not limited to any specific number of SRS resources or resources in the resource sets. FIGS. 1A-1C illustrate example diagrams for indication of TCI states in related art. As shown in FIG. 1A, in unified TCI framework, the first and second indicated TCI states refer to the TCI states that are applied for transmission/reception of DL/UL signals or channels (e.g. PDCCH/PDSCH/PUSCH/ PUCCH) from the preconfigured set of TCI states (e.g. activated TCI state list 1). A TCI state may comprise at least one DL RS which is used as a reference for DL Reception or UL transmissions between the terminal device 110 and the TRPs 120 and 130 (these can be referred as network). FIG. 1B. illustrates an example of an activated TCI state list with one or more codepoints that can be indicated using a DCI based beam indication in unified TCI state framework (single-DCI multi-TRP, S-DCI mTRP). An activated TCI state list may comprise RRC-configured TCI states that are activated using a MAC CE. In multiple TRP extension for unified TCI framework, the terminal device may have multiple (e.g. 2) indicated TCI states. When the terminal device is signaled a codepoint value using a DCI, if the codepoint has two TCI states, it refers to the TCI states that are considered to be the first indicated TCI state (0) and the second indicated TCI state (1). For example, if DCI codepoint #2 is signalled, the first indicated TCI state (0) is TCI state #2 and the second indicated TCI state (1) is TCI state #3. If only one TCI state ID is listed in the codepoint, it may refer to first or second indicated TCI state or it may mean that only one TCI state is indicated (i.e. there is only one indicated TCI state). As shown in FIG. 1C, a further example of TCI state framework is illustrated. As an example for M-DCI mTRP, when the terminal device is signaled a codepoint value using a DCI, the TCI state or states (e.g. separate DL/UL as in codepoint #5) indicated by the code point are considered to be the first or second indicted TCI State. As an example, the first indicated TCI State (0) is signalled by the DCI codepoint #1 and the second indicating TCI State (1) is signalled by the codepoint #4. The M-DCI operation may be configured for UE using the (RRC) parameter CORESETpoolIndex (or other parameter) which groups one or more CORESETs having the same value of CORESETpoolindex (e.g. value 0 or 1). In one example the first indicated TCI State may be applied for the CORESETs (and other DL/UL channels/SRS) associated with the first CORESETpoolIndex value (0) and the second indicated TCI State may be applied for the CORESETs (and other DL/UL channels/SRS) associated with the second CORESET-poolIndex value (1). In some examples there may be two separate lists of activated TCI States e.g. per CORESET-poolIndex. If an activated TCI State list has only one codepoint (only one entry) it is considered to be the indicated TCI State (or states). In some example embodiments herein, there may be only one indicated TCI state (0).

In Rel-17, an SRS resource set may be configured to follow an indicated (unified) TCI state. When the terminal device receives a beam indication for (joint/DL or UL) TCI state, the SRS resources in the SRS resource set, that are configured to follow the TCI state, assume the DL RS indicated by the TCI state to be the spatial relation RS for the SRS transmission. If an SRS resource is not configured to follow the unified TCI state, the spatial relation for the SRS resource(s) in the SRS resource set needs to be updated by network (by updating the spatial relation RS via MAC CE for Semi-Persistent SRS (SP-SRS) or by reconfiguring the UL TCI state (using RRC) as spatial relation.

In Rel-18, the MIMO operation is enhanced with multiple indicated TCI states (e.g. up to 2 unified TCI states can be indicated). In addition, enhancement to enable the UL (simultaneous) multiple panel transmission is considered. The current framework for unified TCI and SRS configuration is not flexible to handle multi panel uplink sounding and thus cannot support efficiently the multi-panel uplink operation. In other words, as typically the terminal device is equipped with three or four antenna panels and as discussed above, only two SRS resource sets can be configured. Any methods herein are not limited to multiple panel transmission.

In addition, conventionally, the SRS resource set can be configured to follow unified TCI state but the SRS resource set cannot be overridden or reconfigured without using RRC reconfiguration message which causes delay. Moreover, the SRS cannot be associated in flexible manner to one or more indicated TCI states. In addition, the current followed unified configuration does not allow "floating or dynamic operation" and indication that which of the SRS resource sets are configured to the indicated TCI state.

The present disclosure provides a solution for configuring SRS resource sets in dynamic manner in unified TCI state framework for sounding and for uplink (multi-panel) transmission. Principle and embodiments of the present disclosure will be described in detail below with reference to the accompanying drawings. It should be also noted that the methods herein apply in general manner to other signals and channels, e.g. (NZP-) CSI-RS. However, it is to be noted that these embodiments are given to enable the skilled in the art to implement the solution as proposed herein and not intended to limit scope of the present application in any way.

Figure 2:
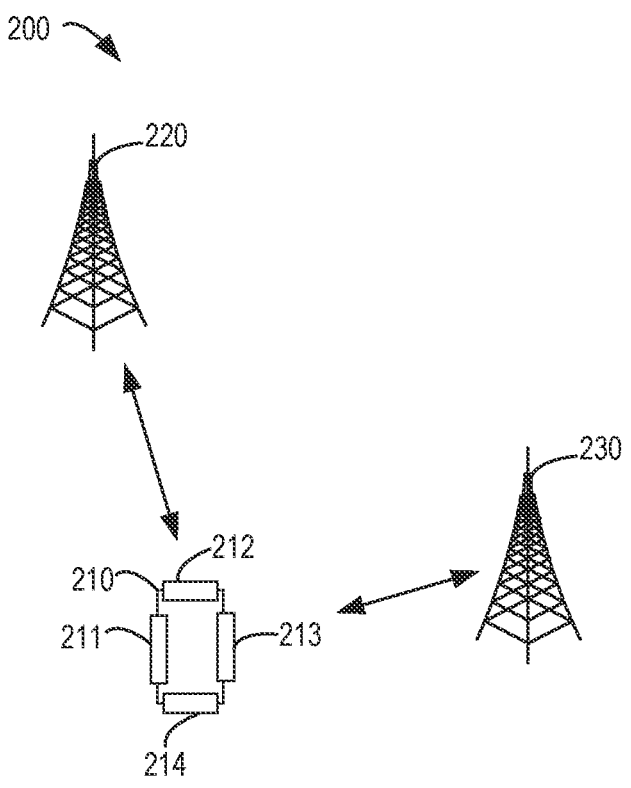
FIG. 2 illustrates an example communication network in which embodiments of the present disclosure may be implemented.

Reference is now made to FIG. 2, which illustrates an example communication system 200 in which embodiments of the present disclosure may be implemented. As illustrated in FIG. 2, the system 200 includes two network devices, such as network devices 220, 230. The network devices 220, 230 may each have one respective group of antenna ports. In other words, the network devices 220, 230 may be associated with or function as two respective TRPs, and thus sometimes they can be also referred to as TRP 220 and TRP 230 in the present disclosure. For clarity purposes, TRP 220 may be also referred to a first TRP, and TRP 230 may be also referred to a second TRP.

The network devices 220, 230 may each operate using different frequency bands in both DL and UL. In communication systems, "UL" refers to a communication link in a direction from a terminal device to a network device, and "DL" refers to a communication link in a direction from the network device to the terminal device.

The system 200 may also include one or more terminal devices, such as terminal device 210. The terminal device 210 is capable of connecting, for example wirelessly, and communicating in an UL and DL with either or both of the network devices 220, 230 depending on location of the terminal devices in the cells of the network devices 220, 230. The terminal device 210 may be configured to be communicated with network via one or more TRPs, for example 2 TRPs.

The terminal device 210 may be a UE comprising one or more panels. From a wireless communication perspective, a UE may comprise any device having one or more antenna groups configured as a panel. The terminal device 210 in FIG. 2 may include a plurality of panels, such as a first panel 211, a second panel 212, a third panel 213 and a fourth panel 214. In general, a panel may be a UE component that includes one or more antenna group. The antenna group may comprise one or more antennas, antenna elements and/or antenna arrays. Each panel may operate independently to some extent. For example, each panel may be individually activated or deactivated. The activated panel may be used for transmission and/or reception, while the disabled panel may not be used for transmission and/or reception. The panels may be elements of an antenna group that independently control beams. For example, within the panel, one beam may be selected and used for UL transmission. In addition, multiple panels may be used for UL transmission, and multiple beams (each beam selected per panel) may be used for UL transmission across different panels.

It is to be understood that in FIG. 2, the number of network devices and terminal devices is only for the purpose of illustration without suggesting any limitations. Moreover, the number of panels of a terminal device is also given only for the purpose of illustration. The system 200 may include any suitable number of network devices and terminal devices and a terminal device may include any suitable number of panels, as long as the number could be adapted for implementing embodiments of the present disclosure.

Communications in the communication system 200 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 3:
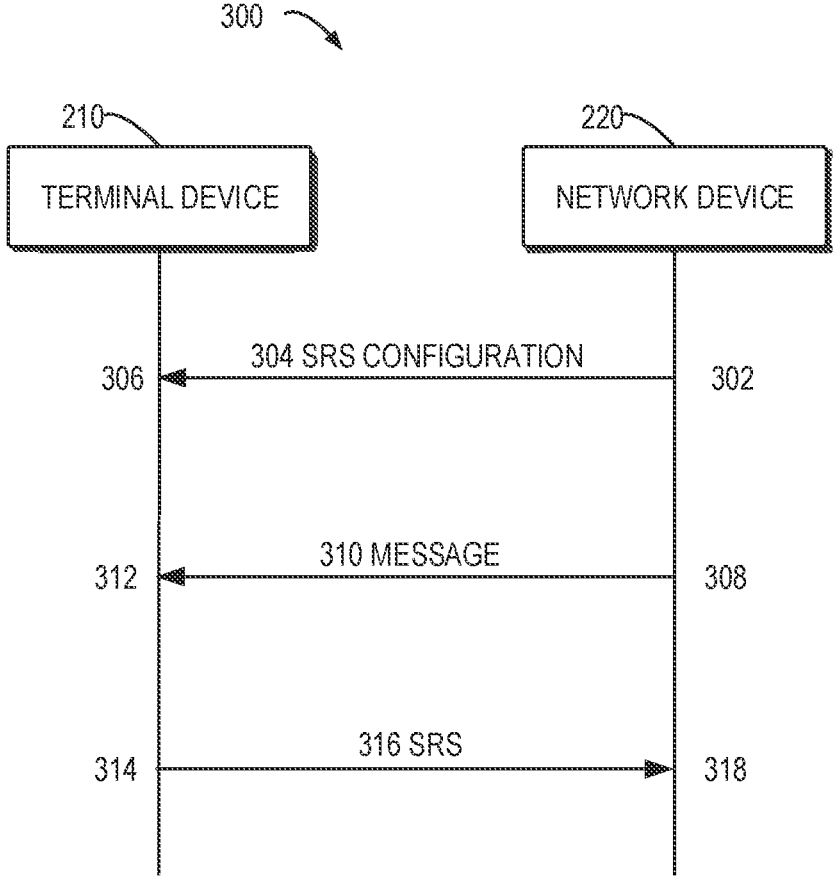
FIG. 3 illustrates a signaling flow for communications according to some embodiments of the present disclosure.

Embodiments of the present disclosure will be described in detail below. Reference is now made to FIG. 3, which shows a signaling chart illustrating process 300 between the terminal device and the network device according to some example embodiments of the present disclosure. Only for the purpose of discussion, the process 300 will be described with reference to FIG. 2. The process 300 may involve the terminal device 210 and the network device 220 in FIG. 2.

In the process 300, the network device 220 transmits (302) SRS configuration 304 to the terminal device 210. The SRS configuration 304 includes one or more SRS resource sets. The terminal device 210 receives (306) the SRS configuration 304. The network device 220 then transmits (308) a message 310 to the terminal device 210. The message 310 includes an indication of which one of the one or more SRS resource sets is configured or enabled to follow or not follow corresponding one or more indicated TCI states from an activated TCI list for the terminal device. The terminal device 210 receives (312) the message 310. The terminal device 210 transmits (314) an SRS 316 to the network device 220 based on the indication. The network device 220 receives (318) the SRS 316.

In some embodiments, the indication may comprise a bitmap corresponding to the one or more SRS resource sets. In some embodiments, the bitmap may comprise one or more bit fields each indicating an associated value for at least corresponding one of the one or more SRS resource sets. In some embodiments, each bit field of the bitmap may indicate which one of the one or more SRS resource sets is configured or enabled to follow or not follow the corresponding one or more indicated TCI states from the activated TCI list for the terminal device 210. In some embodiments (or in any embodiments herein), the message may be a DCI or a MAC CE.

In some embodiments, the transmission of the SRS may be based on an SRS resource set enabled to follow the corresponding one or more indicated TCI states from the activated TCI list for the terminal device 210.

In some embodiments, the transmission of the SRS may be based on an indicated/configured spatial relation for an SRS resource set configured not to follow the corresponding one or more indicated TCI states from the activated TCI list for the terminal device 210.

In some embodiments, the transmission of the SRS may be suspended or disabled when a SRS resource set for the transmission of the SRS is configured not to follow the corresponding one or more indicated TCI states from the activated TCI list for the terminal device 210. In some embodiments, the SRS resource set for the transmission of the SRS may be not transmitted or not used when being configured not to follow the corresponding one or more indicated TCI states from the activated TCI list for the terminal device.

In some embodiments, the transmission of the SRS may be based on an indicated/configured spatial relation for an SRS resource set configured to follow the corresponding one or more indicated TCI states from the activated TCI list for the apparatus. The indicated/configured spatial relation may override a spatial relation for the transmission of the SRS as indicated by the corresponding one or more indicated TCI states from the activated TCI list for the terminal device 210.

In some embodiments, the terminal device 210 may detach and/or attach the one or more SRS resource sets from the corresponding one or more indicated TCI states in dynamic manner in accordance with the indication.

In some embodiments, the terminal device 210 may perform beam switching to the corresponding one or more indicated TCI states according to configure of the one or more SRS resource sets whether to follow or not follow the corresponding one or more indicated TCI states.

In some embodiments, the terminal device 210 may trigger uplink transmission selectively over the one or more SRS resource sets in accordance with the indication.

Figure 4:
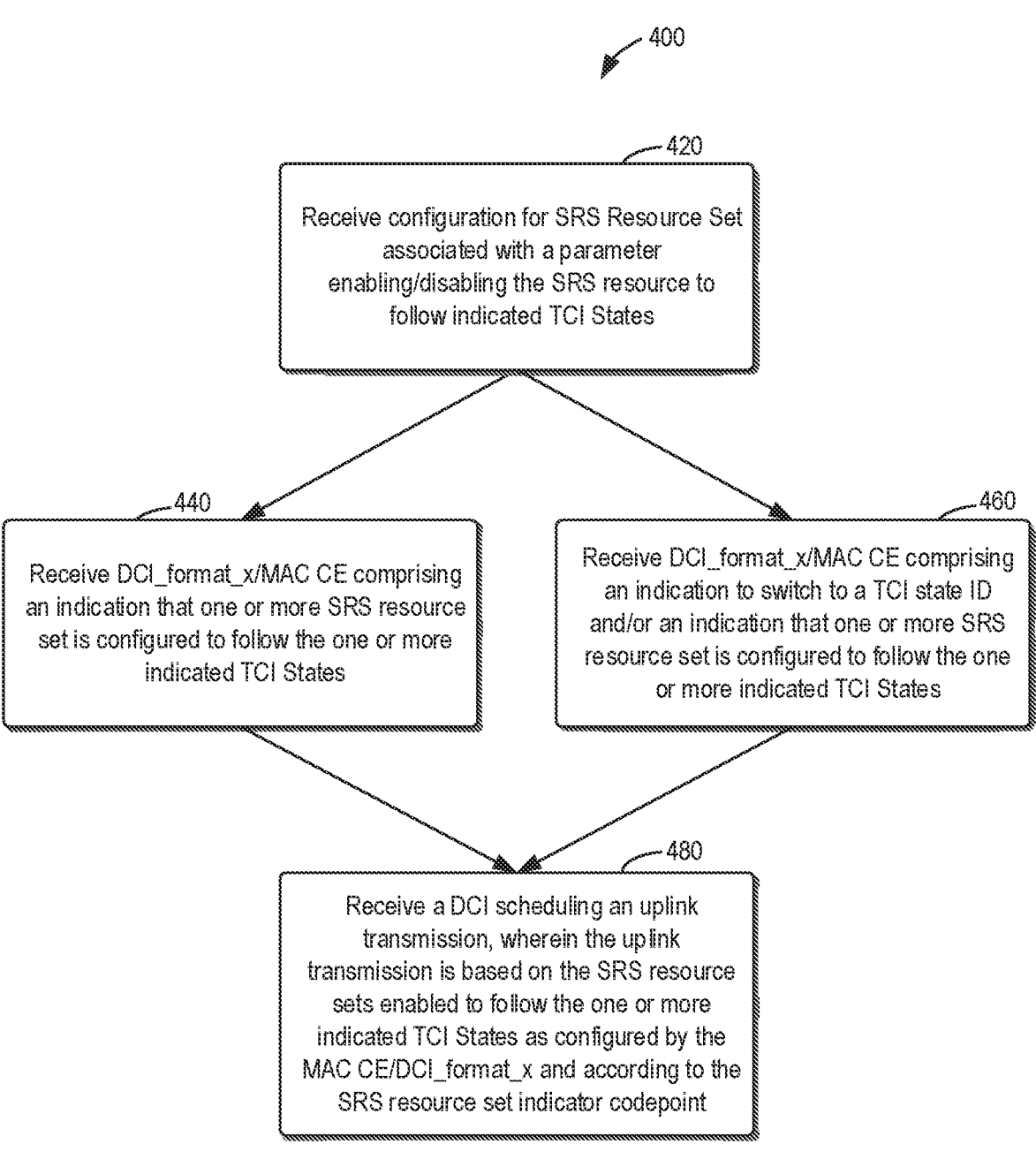
FIG. 4 illustrates an example illustration of configuration and triggering flow of uplink transmission according to some embodiments of the present disclosure.

FIG. 4 illustrates an example illustration of configuration and triggering flow 400 of uplink transmission according to some embodiments of the present disclosure. For the purpose of discussion, the configuration and triggering flow 400 will be described from the perspective of the terminal device 210 with reference to FIG. 2.

As an example implementation, in the configuration and triggering flow 400, the association of the SRS resource set to an indicated TCI state is done in a DL message commanding the beam switch or DL message without beam switch. At block 420, the terminal device 210 may receive configuration (e.g., RRC configuration) for a SRS resource set associated with a parameter enabling/disabling the SRS resource to follow the indicated TCI states. For example, the parameter may be named as followunifiedTCIstate_dynamic or other name may be used. In alternative examples, an existing parameter (e.g. followUnifiedTCIstateSRS) may be used, and the methods described herein may be applied when the parameter is configured.

If this parameter (followunifiedTCIstate_dynamic) is configured for a specific SRS resource set, the terminal device 210 may be further configured using MAC CE or DCI signaling whether the SRS resource set is currently configured to follow or not to follow the one or more indicated unified TCI state (e.g., the first or second indicated unified TCI state). If the SRS resource set is enabled following, the MAC CE/DCI that indicates the beam switch command may indicate which indicated TCI state the specific SRS resource set (out of multiple candidates) follows. The SRS resource set may be configured to follow the first or the second indicated TCI state. For example, at block 440, the terminal device 210 may receive DCI_format_x (or DCI)/MAC CE comprising an indication that one or more SRS resource set is configured to follow the one or more indicated TCI states. Alternatively, at block 460, the terminal device 210 may receive DCI_format_x (or DCI)/MAC CE comprising an indication to switch to a TCI state ID and/or an indication that one or more SRS resource set is configured to follow the one or more indicated TCI states. The DCI_format_x may refer to an existing DCI message which includes the indication, or to a new format, or any downlink control message providing the indication.

In some examples, the terminal device 210 may assume the DCI message to include indication information to follow/not to follow the indicated TCI state for an SRS resource set when at least one higher layer parameter (e.g. RRC) is configured to indicate the (dynamic) following.

This indication may be indicative of configuring and further disabling or enabling a specific resource set to follow/not to follow an indicated TCI state. In one option, if the SRS resource set is configured not to follow any TCI state (i.e., disabled) but is associated with the parameter (followunifiedTCIstate_dynamic), the SRS resource may be considered to be inactive. In other words, the SRS is not transmitted unless explicitly triggered. When the parameter (followunifiedTCIstate_dynamic) is configured, the SRS resource set enabled to follow unified TCI state configuration may be disabled and/or the spatial relation may be switched to have another downlink reference (i.e. not the indicated TCI state). Switching/configuring to another DL reference (as a spatial relation RS) may override the (DL) reference applied based on the indicated (unified) TCI state. The SRS resource in the resource set configured with a spatial relation may be indicated to follow the unified TCI State (with methods described herein).

In any of the embodiments herein the followunifiedTCIstate_dynamic may be used interchangeably with any (RRC) parameter that provides the terminal device with the configuration of whether SRS resource set can be configured to follow/not to follow the indicated TCI state as described herein.

As used herein, the term "following an indicated TCI state" may mean that the SRS is applying the reference signal (RS) indicated by the (indicated) TCI state as a spatial relation RS. In other words, the SRS resource(s) in the SRS resource set are transmitted according to the (spatial relation RS, i.e., the reference signal determining the uplink spatial filter/uplink beam is used for the SRS transmission). In one example the spatial relation reference signal may be used in such way that the (same) beam spatial filter/beam used to receive the spatial relation reference signal (a downlink reference signal, such as SSB/CSI-RS) is used as the uplink spatial filter/uplink beam for the SRS transmission.

At block 480, the terminal device 210 may receive a DCI scheduling an uplink transmission. The uplink transmission may be based on the SRS resource sets enabled to follow the one or more indicated TCI states as configured by the MAC CE/DCI_format_x and according to the SRS resource set indicator codepoint.

In this way, the terminal device 210 may be configured to "detach and attach" one or more SRS resource sets from the unified TCI state indication in dynamic manner so that one or more SRS resource sets may be used for sounding the uplink channel (i.e. dynamically detached to not follow specific TCI state). After the sounding in efficient manner, the network device 220 may directly indicate SRS resource set to follow unified TCI state, indicate beam switch and trigger uplink transmission according to the SRS resource set that has been used for sounding. In other words, the terminal device 210 may be configured to perform UL transmission based on the SRS resource set that was used for sounding.

In one embodiment, the message 310 in FIG. 3 may be a DCI. The DCI may contain an indication of which one, among the one or more SRS resource sets that are configured to follow unified TCI states, follow the indicated TCI state after reception or after acknowledgement of the DCI. The DCI may provide the indication of a unified TCI state, or it may not contain any indication of a TCI state.

Figure 5A:
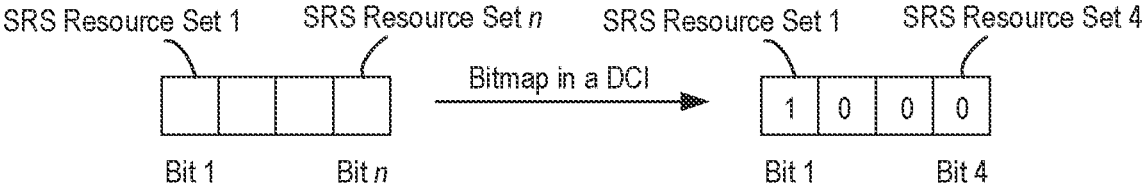
FIG. 5A-5C illustrate an example diagram of a bitmap in a DCI corresponding to the SRS resource set configuration according to some embodiments of the present disclosure.
Figure 5B:
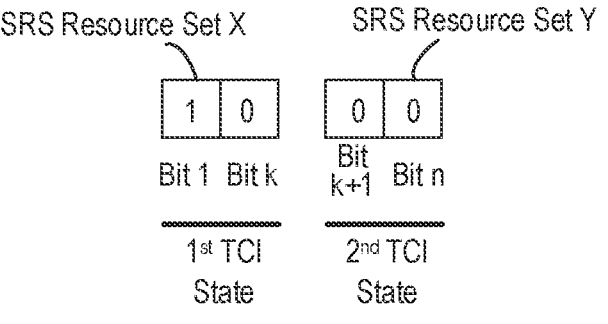
Figure 5C:
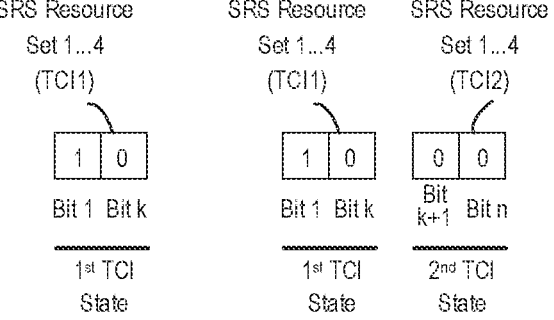

Reference is now made to FIG. 5A-5C, which illustrate an example diagram of a bitmap(s)/bit field(s) in a DCI corresponding to the SRS resource set configuration according to some embodiments of the present disclosure. A DCI (or alternatively a MAC CE) may comprise a field or fields indicating association of one or more SRS resource sets with one or more indicated TCI States (e.g. first or second). Additionally or alternatively the DCI (or a MAC CE) may comprise an indication for a TCI state that is the indicated TCI State (first or second).

As shown in FIG. 5A, the DCI may contain a bitmap corresponding to the SRS resource set configuration. The bitwidth of the bitmap may correspond to the number of configured SRS resource sets that are configured to follow unified TCI states. In the embodiment in FIG. 5A, four SRS resource sets are configured to follow unified TCI states and thus the corresponding bitwidth of the bitmap in the DCI is four. It should be understood that the number of SRS resource sets that are configured to follow unified TCI states is only for the purpose of illustration without suggesting any limitations. The terminal device 210 may be configured with any number of SRS resource sets that are configured to follow unified TCI states, as long as the number could be adapted for implementing embodiments of the present disclosure.

As shown in FIG. 5A, by applying the bitmap, bit 1 corresponding to the SRS resource set 1 is set to be "1" while bits 2, 3 and 4 corresponding to the SRS resource sets 2, 3 and 4 are set to be "0". A bit that is set to "1" indicates that the SRS resource set corresponding to the bit field is configured to follow the indicated TCI state. A bit that is set to "0" indicates that the SRS resource set corresponding to the bit field is configured not to follow the indicated TCI state. The SRS resource sets IDs that are indicated by the bitmap may correspond to the bit position with one to one mapping e.g. first bit position corresponds to the SRS resource set ID (ID=1). Alternatively, the SRS resource set IDs may be mapped to bit position based on the ascending (or descending) order based on whether the parameter (to enable/disable following) is configured for the set. If configured, then the SRS resource set is mapped to the bit position in ascending/descending order. If not, the SRS resource set is not mapped to the bit position. In other words, in the embodiment in FIG. 5A, the SRS resource set 1 is configured to follow the indicated TCI state while the SRS resource sets 2, 3 and 4 are configured not to follow the indicated TCI state. The DCI may comprise a bitmap corresponding to each indicated TCI state (e.g., for the first and second indicated TCI states). In one example, multiple SRS resource sets can be configured to follow an indicated TCI State. The resource set identifiers are considered as example values similarly as the number of bits in the bitmap.

In another embodiment in FIG. 5B, the bitmap may be divided between multiple indicated TCI states (e.g., the first and second indicated TCI states) in fixed manner or in configured manner. For example, the first k bits in the bitmap may correspond to a first indicated TCI state and the following k+1 to n bits in the bitmap are may correspond to a second (indicated) TCI state.

In a further embodiment in FIG. 5C, a bit field up to k-bits are used to indicate which of the SRS resource sets is configured to follow the indicated TCI state. Using 1 bit of value, up to 2 (possible values of) SRS resource sets may be indicated. And using up to 2 bits (i.e., k=2), one of the 4 possible values may be indicated. There may be a k-bit field associated with each indicated TCI state. The values indicated by the field may correspond to the SRS resource set IDs. As a further example, the values indicated by the bitfield may correspond to the SRS resource set IDs in ascending (or descending) order that are configured to follow/not follow the indicated TCI state. Alternatively, the values indicated by the field may correspond to the SRS resource set IDs through explicit association. For example, a specific SRS resource set ID is associated/configured with a specific value that can be indicated by the bitfield (e.g. SRS Resource Set ID #2 may be mapped to 2 bit binary value (b) '11b'=3 (or alternatively '00b'=1, '01b'=2 and so on).

In one example, the SRS resource set associated with the indicated value by the bit field may be configured to follow the indicated (unified) TCI state (e.g. the first or second indicated TCI state). As a further example, the first and second TCI states may have respective bit fields (e.g 2 bit-bit fields) and the values indicated by the respective bitfields map to the SRS resource set ID associated with the respective first or second indicated TCI States. For example, SRS resource set ID #1 may be associated with first indicated TCI State and may be referred with a (first) bitfield value '=1' and SRS resource set ID #2 may be associated with second indicated TCI State and may be referred with a (second) bitfield value '=1'. In another example, other SRS resource sets not associated with the indicated value (but associated with other possible values) may be configured not to follow the indicated TCI State (based on the indication i.e. the indicated SRS resource set by the value is configured to follow and other SRS resource sets are configured not to follow). One value may be associated with one or more SRS resource sets.

In the embodiments in FIGS. 5A-5C, one or more SRS resource sets may be configured to follow the indicated TCI state(s). In one option, an SRS resource set may be configured to follow both indicated TCI states (i.e., the first and second TCI states). In such scenario, the SRS resource set may be transmitted using the transmission assumption of both TCI states. This may be used e.g. for the single frequency network (SFN) transmission where same information is transmitted using multiple TCIs.

In some embodiments, a bit/bit field in the DCI may indicate whether the current DCI updates the SRS resource set information (follow/not follow). One value (e.g., '0') of the bit field may indicate no update while another value (e.g., '1') of the bit field may indicate that the DCI contains field updating information with respect to the TCI state and the SRS resource sets. If the bit field indicates no update, the terminal device may ignore the information on the SRS resource set configuration and association to the indicated TCI state may be determined based on previous/current information or configuration (i.e., configuration is not updated). If the bit field indicates that information/configuration is updated, the terminal device may interpret the following/associated bits according to the embodiments herein.

In some embodiments, one or more indicated TCI states may be indicated (e.g., the first and/or second TCI states). Whether the SRS configuration update applies for the first or second indicated TCI state may be determined at least based on the CORESET pool index value (multi-DCI specific example) configured for the CORESET, which is used to schedule the DCI indicating the SRS resource set configuration. If the DCI is scheduled using CORESETs of first pool index value, the SRS resource set configuration (updates) associates with the first indicated TCI state associated with the pool index (or in general the SRS resource set configuration associates with the indicated TCI state which associates with the indicated TCI state of the CORESET of the CORESETpoolindex). Whether the SRS configuration update applies for the first or second indicated TCI state may be determined further based on a value that is used to group the CORESETs in specific manner to more than one or more groups (e.g., group ID). If the DCI is scheduled using CORESETs of CORESET group ID #1, the SRS resource set updates apply for the first indicated TCI state associated with the CORESET group ID #1. In other words, whether the SRS configuration is associated with the first and/or second indicated TCI State, may be determined by the terminal device in implicit manner. In some embodiments, a bit field in the DCI may be used to indicate whether enabling/disabling the following of the unified TCI state for SRS resource sets is for the first or the second indicted TCI state. In one embodiment, the DCI may include respective bit fields that are specific for the first or the second indicted TCI state. For example, a bit field in the DCI may explicitly indicate whether the SRS configuration is updated for the first indicated TCI state, for the second indicated TCI state, or for both the first and second indicated TCI states.

In some embodiments, the (latest) DCI indication may override any previous configuration of which SRS resource set(s) follow which TCI state. In other words, the configuration provided in the DCI is used as the latest configuration. In some embodiments, if the DCI does not provide any update to the SRS resource sets and association to the indicated TCI, the previous configuration remains.

In some embodiments, the DCI message may be used to dissociate any SRS resource set with a indicated TCI state. For example, if a SRS resource set state is dissociated, it does not follow the indicated TCI state. In other words, the following of indicated TCI states is not enabled for one or more SRS resource sets.

In some embodiments, the DCI message may comprise both an indication of switching the TCI state and the configuration of specific SRS resource set(s) to follow the indicated TCI state.

In some embodiments, the MAC CE message may comprise both an indication of switching the TCI state and the configuration of specific SRS resource set(s) to follow the indicated TCI state.

In some embodiments, the SRS resource sets following the indicated TCI states (e.g., the SRS resource sets that are enabled to follow the indicated TCI states) may be used for scheduling in the following manner. SRI value #0 in SRS resource indicator field (and Precoding information and number of layers field) may be associated with the SRS resource set configured to follow the first indicated TCI state. SRI value #1 in SRS resource indicator field (and Precoding information and number of layers field) may be associated with the SRS resource set configured to follow the second indicated TCI state. SRI value #2 in SRS resource indicator field (and Precoding information and number of layers field) may be associated with the SRS resource set configured to follow the first indicated TCI state and associated with the SRS resource set configured to follow the second indicated TCI state.

Although DCI is used for the signaling in the above embodiments, any of the above signaling may be performed using a MAC CE. In some embodiments, the activation/deactivation (i.e., enabling or disabling) the following of the unified TCI state for a specific SRS resource set may be toggled using a MAC CE. In some embodiments, the SRS resource set, which is configured to follow the unified TCI state, may be configured with a new spatial relation (e.g. using a MAC CE). The new spatial relation configuration dissociates the SRS resource set from the indicated TCI state. In some embodiments, the SRS resource set, which is configured not to follow the unified TCI state, may be configured with a new spatial relation (e.g. using a MAC CE). This can be used for e.g., sounding purposes prior to beam indication. In some embodiments, the MAC CE may indicate whether the SRS resource set is configured to follow the indicated TCI state (the first or second indicated TCI state). This may be done without explicit configuration of spatial relation.

In any of the embodiments herein, the SRS and (NZP-) CSI-RS may be used interchangeably (and thus in some cases the uplink transmission may be replaced with downlink reception). As an example, a CSI-RS resource or resource set may be configured to follow/not to follow an indicated TCI state (first or second). If a CSI-RS resource or resource set is configured to follow the indicated TCI state. The TCI state indication followed by CSI-RS may be alternatively or additionally configured and separately or jointly indicated. Similar signaling methods as described herein (for SRS resource sets) may be applied for CSI-RS resource or CSI-RS resource sets.

With embodiments of the present disclosure, multiple SRS resource sets may be flexibly assigned with dependence to the indicated TCI state, thus providing flexibility, lower latency and signaling overhead reduction for beam management operation such as beam change. Multiple SRS resource sets may be used for uplink channel sounding and uplink transmissions (for sounded UL transmission) may be triggered right after the change of TCI state. In addition, more than two UE panels may be supported in dynamic manner.

FIG. 6 shows a flowchart of an example method 600 implemented at a terminal device in accordance with some embodiments of the present disclosure. For the purpose of discussion, the method 600 will be described from the perspective of the terminal device 210 with reference to FIG. 2. With the method 600, SRS resource sets may be dynamically detached to not follow specific TCI state and used for sounding the uplink channel in an efficient manner.

At block 620, the terminal device 210 receives, from a network device 220, sounding reference signal, SRS, configuration comprising one or more SRS resource sets. At block 640, the terminal device 210 receives, from the network device 220, a message comprising an indication of which one of the one or more SRS resource sets is configured or enabled to follow or not follow corresponding one or more indicated Transmission Configuration Indication, TCI, states from an activated TCI list for the terminal device. At block 660, the terminal device 210 transmits, to the network device 220, an SRS based on the indication.

In some embodiments, the indication may comprise a bitmap corresponding to the one or more SRS resource sets. In some embodiments, the bitmap may comprise one or more bit fields each indicating an associated value for at least corresponding one of the one or more SRS resource sets. In some embodiments, each bit field of the bitmap may indicate which one of the one or more SRS resource sets is configured or enabled to follow or not follow the corresponding one or more indicated TCI states from the activated TCI list for the terminal device.

In some embodiments, the message may be a DCI or a MAC CE. In some embodiments, the transmission of the SRS may be based on an SRS resource set enabled to follow the corresponding one or more indicated TCI states from the activated TCI list for the terminal device 210.

In some embodiments, the transmission of the SRS may be based on an indicated/configured spatial relation for an SRS resource set configured not to follow the corresponding one or more indicated TCI states from the activated TCI list for the terminal device 210.

In some embodiments, the transmission of the SRS may be suspended or disabled when a SRS resource set for the transmission of the SRS is configured not to follow the corresponding one or more indicated TCI states from the activated TCI list for the terminal device 210. In some embodiments, the SRS resource set for the transmission of the SRS may be not transmitted or not used when being configured not to follow the corresponding one or more indicated TCI states from the activated TCI list for the terminal device 210.

In some embodiments, the transmission of the SRS may be based on an indicated/configured spatial relation for an SRS resource set configured to follow the corresponding one or more indicated TCI states from the activated TCI list for the terminal device. The indicated/configured spatial relation may override a spatial relation for the transmission of the SRS as indicated by the corresponding one or more indicated TCI states from the activated TCI list for the terminal device 210.

In some embodiments, the terminal device 210 may detach and/or attach the one or more SRS resource sets from the corresponding one or more indicated TCI states in dynamic manner in accordance with the indication. In some embodiments, the terminal device 210 may perform beam switching to the corresponding one or more indicated TCI states according to configure of the one or more SRS resource sets whether to follow or not follow the corresponding one or more indicated TCI states. In some embodiments, the terminal device 210 may trigger uplink transmission selectively over the one or more SRS resource sets in accordance with the indication.

Figure 7:
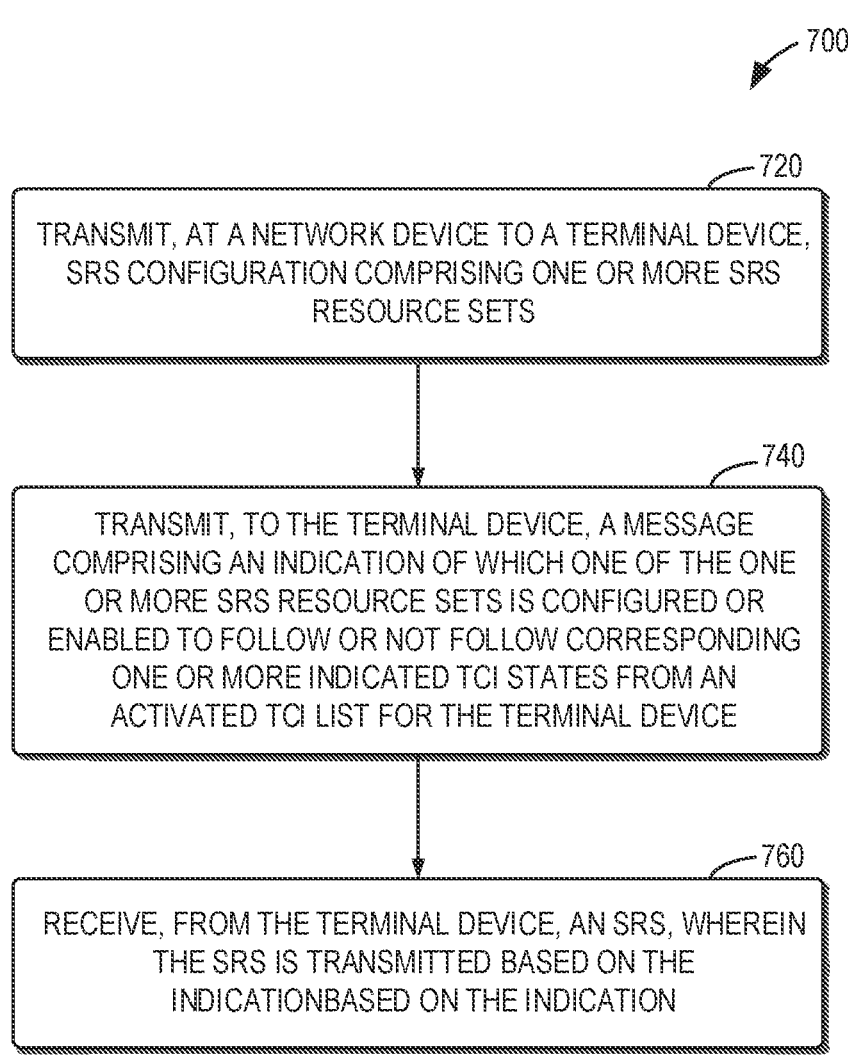
FIG. 7 illustrates a flowchart of a method implemented at a network device according to some other embodiments of the present disclosure.

FIG. 7 shows a flowchart of an example method 700 implemented at a network device in accordance with some embodiments of the present disclosure. For the purpose of discussion, the method 700 will be described from the perspective of the network device 220 with reference to FIG. 2. With the method 700, SRS resource sets may be dynamically detached to not follow specific TCI state and used for sounding the uplink channel in an efficient manner.

At block 720, the network device 220 transmits, to a terminal device 210, sounding reference signal, SRS, configuration comprising one or more SRS resource sets. At block 740, the network device 220 transmits, to the terminal device 210, a message comprising an indication of which one of the one or more SRS resource sets is configured or enabled to follow or not follow corresponding one or more indicated Transmission Configuration Indication, TCI, states from an activated TCI list for the terminal device. At block 760, the network device 220 receives, from the terminal device 210, an SRS which is transmitted based on the indication.

In some embodiments, the indication may comprise a bitmap corresponding to the one or more SRS resource sets. In some embodiments, the bitmap may comprise one or more bit fields each indicating an associated value for at least corresponding one of the one or more SRS resource sets. In some embodiments, each bit field of the bitmap may indicate which one of the one or more SRS resource sets is configured or enabled to follow or not follow the corresponding one or more indicated TCI states from the activated TCI list for the terminal device.

In some embodiments, the message may be a DCI or a MAC CE. In some embodiments, the transmission of the SRS may be based on an SRS resource set enabled to follow the corresponding one or more indicated TCI states from the activated TCI list for the terminal device.

In some embodiments, the transmission of the SRS may be based on an indicated/configured spatial relation for an SRS resource set configured not to follow the corresponding one or more indicated TCI states from the activated TCI list for the terminal device.

In some embodiments, the transmission of the SRS may be suspended or disabled when a SRS resource set for the transmission of the SRS is configured not to follow the corresponding one or more indicated TCI states from the activated TCI list for the terminal device.

In some embodiments, the SRS resource set for the transmission of the SRS may be not transmitted or not used when being configured not to follow the corresponding one or more indicated TCI states from the activated TCI list for the terminal device.

In some embodiments, the transmission of the SRS may be based on an indicated/configured spatial relation for an SRS resource set configured to follow the corresponding one or more indicated TCI states from the activated TCI list for the apparatus. The indicated/configured spatial relation may override a spatial relation for the transmission of the SRS as indicated by the corresponding one or more indicated TCI states from the activated TCI list for the terminal device.

In some embodiments, the indication may be indicative of detaching and/or attaching of the one or more SRS resource sets from the corresponding one or more indicated TCI states in dynamic manner in accordance with the indication. In some embodiments, the indication may be indicative of beam switching to the corresponding one or more indicated TCI states and/or configuring the one or more SRS resource sets whether to follow or not follow the corresponding one or more indicated TCI states. In some embodiments, the indication may be indicative of triggering of uplink transmission selectively over the one or more SRS resource sets in accordance with the indication.

In some embodiments, an apparatus capable of performing any of the method 600 (for example, the terminal device 210) may comprise means for performing the respective steps of the method 600. The means may be implemented in any suitable form. For example, the means may be implemented in a circuitry or software module.

In some embodiments, the apparatus comprises: means for receiving, at a terminal device from a network device, sounding reference signal, SRS, configuration comprising one or more SRS resource sets; means for receiving, from the network device, a message comprising an indication of which one of the one or more SRS resource sets is configured or enabled to follow or not follow corresponding one or more indicated Transmission Configuration Indication, TCI, states from an activated TCI list for the terminal device; and means for transmitting, to the network device, an SRS based on the indication.

In some embodiments, the indication may comprise a bitmap corresponding to the one or more SRS resource sets. In some embodiments, the bitmap may comprise one or more bit fields each indicating an associated value for at least corresponding one of the one or more SRS resource sets. In some embodiments, each bit field of the bitmap may indicate which one of the one or more SRS resource sets is configured or enabled to follow or not follow the corresponding one or more indicated TCI states from the activated TCI list for the terminal device.

In some embodiments, the message may be a DCI or a MAC CE. In some embodiments, means for transmitting the SRS may comprise means for transmitting the SRS based on an SRS resource set enabled to follow the corresponding one or more indicated TCI states from the activated TCI list for the terminal device.

In some embodiments, means for transmitting the SRS may comprise means for transmitting the SRS based on an indicated/configured spatial relation for an SRS resource set configured not to follow the corresponding one or more indicated TCI states from the activated TCI list for the terminal device.

In some embodiments, means for transmitting the SRS may comprise means for suspending or disabling the transmission of the SRS when a SRS resource set for the transmission of the SRS is configured not to follow the corresponding one or more indicated TCI states from the activated TCI list for the terminal device.

In some embodiments, the SRS resource set for the transmission of the SRS may be not transmitted or not used when being configured not to follow the corresponding one or more indicated TCI states from the activated TCI list for the terminal device.

In some embodiments, means for transmitting the SRS may comprise means for transmitting the SRS based on an indicated/configured spatial relation for an SRS resource set configured to follow the corresponding one or more indicated TCI states from the activated TCI list for the apparatus. The apparatus may further comprise means for overriding, with the indicated/configured spatial relation, a spatial relation for the transmission of the SRS as indicated by the corresponding one or more indicated TCI states from the activated TCI list for the terminal device.

In some embodiments, the apparatus may further comprise means for detaching and/or attaching the one or more SRS resource sets from the corresponding one or more indicated TCI states in dynamic manner in accordance with the indication. In some embodiments, the apparatus may further comprise means for performing beam switching to the corresponding one or more indicated TCI states according to configure of the one or more SRS resource sets whether to follow or not follow the corresponding one or more indicated TCI states. In some embodiments, the apparatus may further comprise means for triggering uplink transmission selectively over the one or more SRS resource sets in accordance with the indication.

In some embodiments, the apparatus further comprises means for performing other steps in some embodiments of the method 600. In some embodiments, the means comprises at least one processor and at least one memory including computer program code, the at least one memory and computer program code configured to, with the at least one processor, cause the performance of the apparatus.

In some embodiments, an apparatus capable of performing any of the method 700 (for example, the network device 220) may comprise means for performing the respective steps of the method 700. The means may be implemented in any suitable form. For example, the means may be implemented in a circuitry or software module.

In some embodiments, the apparatus comprises means for transmitting, from a network device to a terminal device, sounding reference signal, SRS, configuration comprising one or more SRS resource sets; means for transmitting, to the terminal device, a message comprising an indication of which one of the one or more SRS resource sets is configured or enabled to follow or not follow corresponding one or more indicated Transmission Configuration Indication, TCI, states from an activated TCI list for the terminal device; and means for receiving, from the terminal device, an SRS which is transmitted based on the indication.

In some embodiments, the indication may comprise a bitmap corresponding to the one or more SRS resource sets. In some embodiments, the bitmap may comprise one or more bit fields each indicating an associated value for at least corresponding one of the one or more SRS resource sets. In some embodiments, each bit field of the bitmap may indicate which one of the one or more SRS resource sets is configured or enabled to follow or not follow the corresponding one or more indicated TCI states from the activated TCI list for the terminal device.

In some embodiments, the message may be a DCI or a MAC CE. In some embodiments, the transmission of the SRS may be based on an SRS resource set enabled to follow the corresponding one or more indicated TCI states from the activated TCI list for the terminal device.

In some embodiments, the transmission of the SRS may be based on an indicated/configured spatial relation for an SRS resource set configured not to follow the corresponding one or more indicated TCI states from the activated TCI list for the terminal device.

In some embodiments, the transmission of the SRS may be suspended or disabled when a SRS resource set for the transmission of the SRS is configured not to follow the corresponding one or more indicated TCI states from the activated TCI list for the terminal device.

In some embodiments, the SRS resource set for the transmission of the SRS may be not transmitted or not used when being configured not to follow the corresponding one or more indicated TCI states from the activated TCI list for the terminal device.

In some embodiments, the transmission of the SRS may be based on an indicated/configured spatial relation for an SRS resource set configured to follow the corresponding one or more indicated TCI states from the activated TCI list for the apparatus. The indicated/configured spatial relation may override any spatial relation previously configured for the transmission of the SRS as indicated by the corresponding one or more indicated TCI states from the activated TCI list for the terminal device. For example, a SRS resource set, which is configured or enabled to follow the corresponding one or more indicated TCI states from the activated TCI list for the apparatus, may be configured with a new spatial relation (e.g. using DCI or a MAC CE) for the transmission of the SRS. The new indicated/configured spatial relation (e.g. using DCI or a MAC CE) overrides any previous spatial relation configured for the SRS resource set for the transmission of the SRS.

In some embodiments, the indication may be indicative of detaching and/or attaching of the one or more SRS resource sets from the corresponding one or more indicated TCI states in dynamic manner in accordance with the indication. In some embodiments, the indication may be indicative of beam switching to the corresponding one or more indicated TCI states and/or configuring the one or more SRS resource sets whether to follow or not follow the corresponding one or more indicated TCI states. In some embodiments, the indication may be indicative of triggering of uplink transmission selectively over the one or more SRS resource sets in accordance with the indication.

In some embodiments, the apparatus further comprises means for performing other steps in some embodiments of the method 700. In some embodiments, the means comprises at least one processor and at least one memory including computer program code, the at least one memory and computer program code configured to, with the at least one processor, cause the performance of the apparatus.

Figure 8:
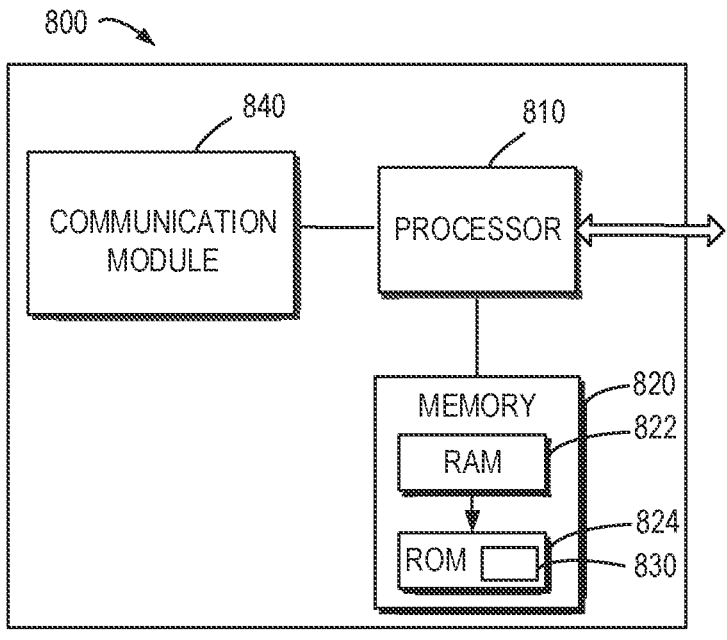
FIG. 8 illustrates a simplified block diagram of an apparatus that is suitable for implementing embodiments of the present disclosure.

FIG. 8 is a simplified block diagram of a device 800 that is suitable for implementing embodiments of the present disclosure. The device 800 may be provided to implement the communication device, for example the terminal device 210 or the network device 220 as shown in FIG. 2. As shown, the device 800 includes one or more processors 810, one or more memories 820 coupled to the processor 810, and one or more transmitters and/or receivers (TX/RX) 840 coupled to the processor 810.

The TX/RX 840 is for bidirectional communications. The TX/RX 840 has at least one antenna to facilitate communication. The communication interface may represent any interface that is necessary for communication with other network elements.

The processor 810 may be of any type suitable to the local technical network and may include one or more of the following: general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

The memory 820 may include one or more non-volatile memories and one or more volatile memories. Examples of the non-volatile memories include, but are not limited to, a Read Only Memory (ROM) 824, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 822 and other volatile memories that will not last in the power-down duration.

A computer program 830 includes computer executable instructions that are executed by the associated processor 810. The program 830 may be stored in the ROM 1020. The processor 810 may perform any suitable actions and processing by loading the program 830 into the RAM 822.

The embodiments of the present disclosure may be implemented by means of the program 830 so that the device 800 may perform any process of the disclosure as discussed with reference to FIGS. 2 to 7. The embodiments of the present disclosure may also be implemented by hardware or by a combination of software and hardware.

Figure 9:
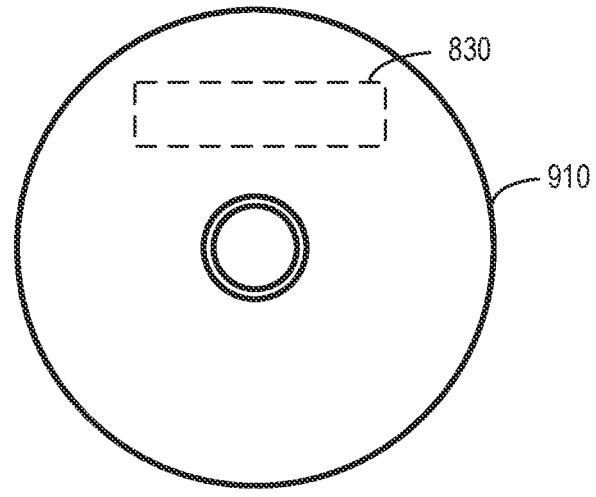
FIG. 9 illustrates a block diagram of an example computer readable medium in accordance with some embodiments of the present disclosure.

In some embodiments, the program 830 may be tangibly contained in a computer readable medium which may be included in the device 800 (such as in the memory 820) or other storage devices that are accessible by the device 800. The device 800 may load the program 830 from the computer readable medium to the RAM 822 for execution. The computer readable medium may include any types of tangible non-volatile storage, such as ROM, EPROM, a flash memory, a hard disk, CD, DVD, and the like. FIG. 9 shows an example of the computer readable medium 910 in form of CD or DVD. The computer readable medium has the program 830 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 800 as described above with reference to FIGS. 2-7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. The term "non-transitory," as used herein, is a limitation of the medium itself (i.e., tangible, not a signal) as opposed to a limitation on data storage persistency (e.g., RAM vs. ROM).

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. An apparatus, comprising:

at least one processor; and at least one memory comprising computer program code, the at least one memory and computer program code are configured, with the at least one processor, to cause the apparatus at least to:

receive, from a network device via a Radio Resource Control (RRC) message, a sounding reference signal (SRS) configuration comprising one or more SRS resource sets and a parameter that enables dynamic attachment and detachment of at least one SRS resource set to one or more indicated transmission configuration indication (TCI) states without RRC reconfiguration;

receive, from the network device, a Downlink Control Information (DCI) message transmitted on a Control Resource Set (CORESET) having a CORESET pool index value, wherein the DCI message comprises an indication for the at least one SRS resource set, comprising a bitmap field having a plurality of bit positions each mapped to a respective SRS resource set and indicating whether each mapped SRS resource set is configured to follow or not follow a corresponding indicated TCI state from an activated TCI list for the apparatus;

based on the CORESET pool index value, determine a target TCI state from a first indicated TCI state and a second indicated TCI state of an activated TCI list;

update, in accordance with the indication and the target TCI state, an association of the at least one SRS resource set with the target TCI state, wherein:

a first bitmap value configures the at least one SRS resource set to follow the target TCI state by applying a downlink reference signal indicated by the target TCI state as a spatial relation reference signal for uplink SRS transmission, using the same uplink spatial filter as used for reception of the downlink reference signal, and a second bitmap value dynamically detaches the at least one SRS resource set from the target TCI state and disables use of the target TCI state for determining an uplink spatial relation;

perform beam switching to the target TCI state in response to a TCI state switch command received in the DCI message;

transmit, to the network device, an SRS only using the at least one SRS resource set when the association indicates that the at least one SRS resource set follows the target TCI state; and suspend transmission of the SRS without applying an alternative spatial relation when the association indicates that the at least one SRS resource set does not follow the target TCI state.

2. The apparatus according to claim 1, wherein the transmission of the SRS is based on an indicated and configured spatial relation for an SRS resource set configured to follow the corresponding one or more indicated TCI states from the activated TCI list for the apparatus, wherein the indicated and configured spatial relation overrides a spatial relation previously configured for the transmission of the SRS as indicated by the corresponding one or more indicated TCI states from the activated TCI list for the apparatus.

3. A method, comprising:

receiving, at a terminal device from a network device, via a Radio Resource Control (RRC) message, a sounding reference signal (SRS) configuration comprising one or more SRS resource sets, and a parameter associated with at least one resource set of the one or more SRS resource sets, wherein the parameter indicates that the at least one SRS resource set is subject to dynamic configuration to follow or not follow one or more indicated transmission configuration indication (TCI) states;

receiving, from the network device, a Downlink Control Information (DCI) message in a Control Resource Set (CORESET) having a CORESET pool index value, wherein the DCI message comprises an indication for the at least one SRS resource set, based on the CORESET pool index value, determining a target TCI state from a first indicated TCI state and a second indicated TCI state of an activated TCI list;

updating, in accordance with the indication and the target TCI state, an association of the at least one SRS resource set with the target TCI state, wherein:

the indication comprises a bitmap having a first value and a second value, the first value configures the at least one SRS resource set follows the target TCI state by applying a reference signal indicated by the target TCI state as a spatial relation, using a same uplink spatial filter for SRS transmission that is used to receive the reference signal, and the second value configures the at least one SRS resource set not to follow the target TCI state;

performing beam switching to the target TCI state in response to a TCI state switch command received in the DCI message;

transmitting, to the network device, an SRS using the at least one SRS resource set when the association indicates that the at least one SRS resource set follows the target TCI state, and suspend transmission of the SRS using the at least one SRS resource set when the association indicates that the at least one SRS resource set does not follow the target TCI state.

4. The apparatus of claim 3, wherein the at least one memory and computer program code are further configured, with the at least one processor, to cause the apparatus at least to: implicitly determine whether the indication applies to the first indicated TCI state or the second indicated TCI state solely based on a CORESET pool index value of a CORESET carrying the DCI message, without an explicit TCI state identifier being included in the DCI message.

5. The apparatus of claim 4, wherein, when the bitmap configures the at least one SRS resource set not to follow the target TCI state, the apparatus is configured to fully suspend transmission of the sounding reference signal using the at least one SRS resource set without applying an alternative spatial relation reference signal.

* * * * *